Jan. 10, 1967        N. A. KIRK        3,296,998
INERTIALLY ACTUATED SIGNAL DEVICES
Filed March 9, 1966
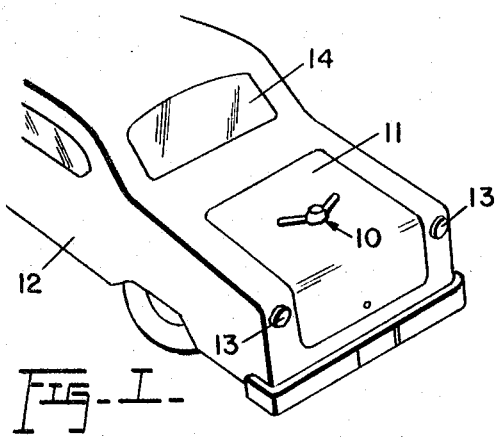
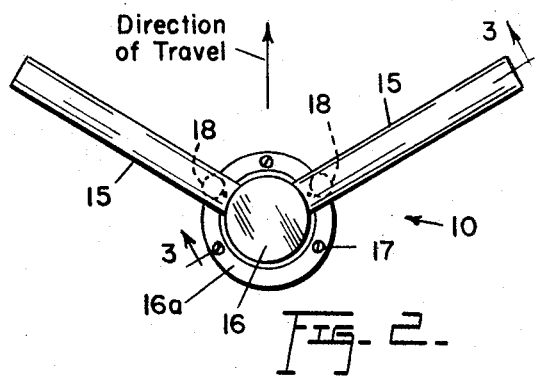
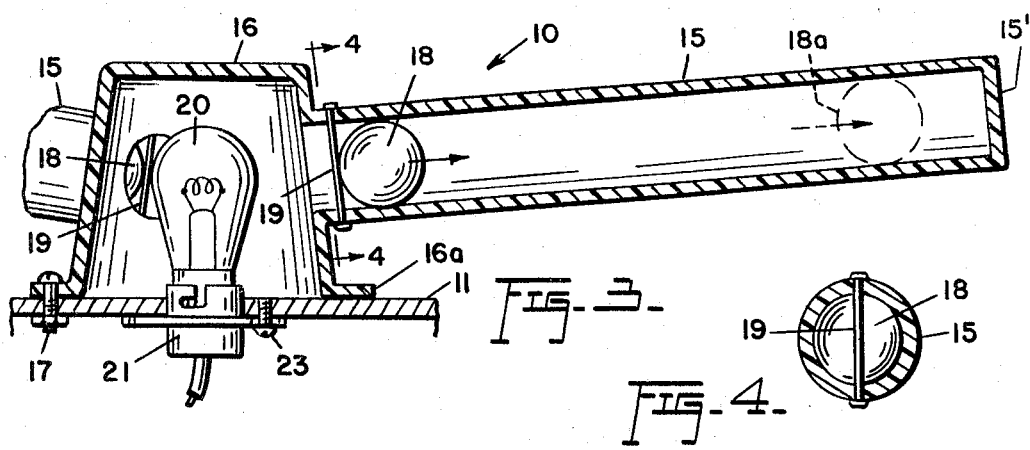
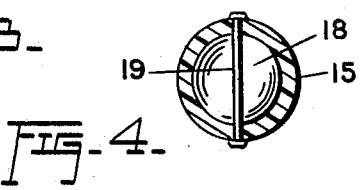
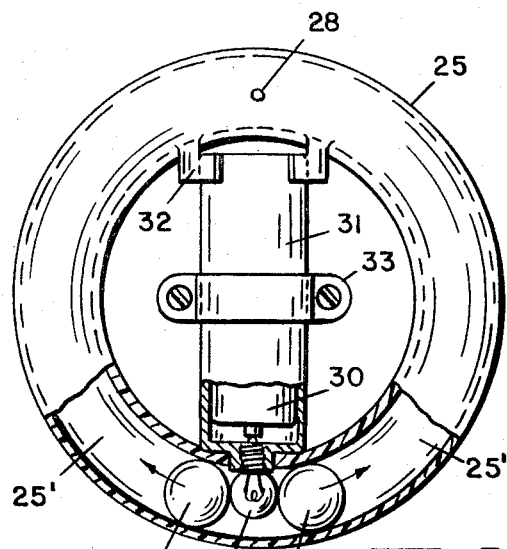
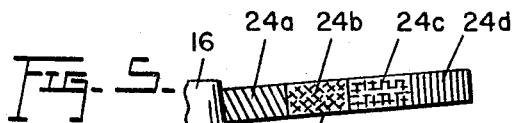
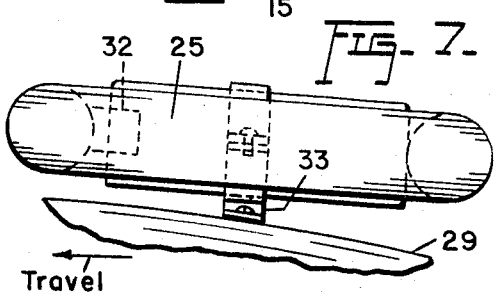
INVENTOR:
NORBERT A. KIRK
By: *Jerry B. Cesak*

United States Patent Office 3,296,998
Patented Jan. 10, 1967

3,296,998
INERTIALLY ACTUATED SIGNAL DEVICES
Norbert A. Kirk, 1048 Byron, Chicago, Ill. 60613
Filed Mar. 9, 1966, Ser. No. 532,994
8 Claims. (Cl. 116—28)

This invention relates to new and useful improvements in signal devices for vehicles, and in particular the invention concerns itself with so-called stop lights which become energized when the vehicle is braked, so that drivers of following vehicles are appropriately warned and possibilities of rear-end collisions are minimized.

As a general safety measure, conventional stop lights serve their intended purpose, but as a practical matter they suffer from a serious disadvantage and inadequacy in that their energization takes place regardless of how lightly or heavily the vehicle is being braked and, in that respect, they fail to provide any indication of the braking effort and vehicle deceleration by which following drivers would know whether the vehicle is coming to a gradual stop or to an abrupt halt.

With the ever increasing volume of traffic on congested roads and correspondingly increasing traffic hazards and collisions, the need for more adequate and effective signal devices cannot be over-emphasized.

Thus, the principal object of the invention is to structurally and functionally improve upon conventional stop lights by the provision of a signal device which clearly and positively shows the rate of braking and deceleration of the vehicle on which it is used, so that drivers of following vehicles may brake and decelerate accordingly to avoid rear-end collisions.

As such, the device of the invention is inertially actuated and, briefly speaking, consists of an elongated hollow signalling member of light-transmitting material, a source of light which is oriented to illuminate the signalling member from the interior thereof in a longitudinal direction, and inertia-responsive light blocking means movable in the signalling member longitudinally toward and away from the light source. The arrangement is such that only the portion of the signalling member between the light source and the light blocking means is illuminated, while the remaining portion of the signalling member is substantially without illumination. Thus, the illuminated portion of the signalling member is variable in length in accordance with the distance of the light blocking means from the light source, which distance, in turn, is governed inertially by the magnitude of the braking effort and resultant deceleration.

Consequently, by observing the length of the illuminated portion of the signalling member on a vehicle, the driver of a following vehicle may readily determine the rate of deceleration of the vehicle which he is following and, by braking his vehicle accordingly, rear-end collisions may be more effectively prevented.

In the preferred embodiment of the invention two signalling members are provided as a pair on opposite sides of a source of light, and when a vehicle so equipped is decelerating along a straight path of travel, the two signalling members become uniformly illuminated to a greater or lesser longitudinal extent, in proportion to the rate of brake application. Moreover, the arrangement of the two signalling members is such that when the vehicle negotiates a curve, with or without braking, the signalling member adjacent the outside of the curve will become illuminated, thus warning following drivers that the vehicle equipped with the signal device is traveling along a curvilinear path.

Another embodiment of the invention is particularly adapted for use at the back of bicycles to attract attention of following traffic by alternate illumination of left and right side portions of the signal device incident to lateral swaying of the bicycle produced by the pedalling action and shifting of weight of the rider.

The signal device of the invention is simple in construction, efficient and dependable in operation, and lends itself to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary perspective view showing the rear portion of a vehicle equipped with the signal device of the invention;

FIGURE 2 is an enlarged top plan view of the signal device per se;

FIGURE 3 is an enlarged, fragmentary sectional view, taken substantially in the plane of the line 3—3 in FIG. 2;

FIGURE 4 is a cross-sectional detail, taken substantially in the plane of the line 4—4 in FIG. 3;

FIGURE 5 is a fragmentary elevational view on a reduced scale, showing one side portion of the signal device with indicia;

FIGURE 6 is a top plan view, partly in section, showing a modified embodiment of the invention; and FIGURE 7 is a side elevational view of the embodiment of FIG. 6 mounted on a bicycle fender.

Referring now to the accompanying drawings in detail, more particularly to FIGS. 1-4, the inertially actuated signal device of the invention is designated generally by the numeral 10. As known in FIG. 1, the signal device 10 is mounted on the trunk lid 11 of a vehicle 12, the latter also being equipped with the usual tail lights 13 which may include conventional stop lights, if so desired. The device 10 may be simply superposed on the trunk lid, or the trunk lid may be recessed to accommodate the device, or if preferred the device may be mounted within the vehicle inside the rear window 14. In any event, the arrangement is such that the signal device 10 is exposed to view of drivers of following vehicles and, by mounting the device at the level of the trunk lid or of the rear window, assurance is had that the device can be seen even when two vehicles come close together.

The signal device 10 comprises elongated, hollow signalling means consisting of a pair of straight, tubular members 15 supported by a central, inverted cup-shaped housing 16, the lower edge of the latter having an outturned apertured flange 16a so that the entire device may be secured to the vehicle, for example to the trunk lid 11, by suitable fasteners 17. As a practical matter, the signalling members 15 may be formed integrally with the housing 16, for example from moulded plastic material, but in any event, the members 15 are made of material which is capable of transmitting light. As such, the members 15 need not be transparent but they should be translucent and preferably of some distinctive color such as red, so that they are clearly visible when illuminated as hereinafter described.

The outer ends 15' of the members 15 are closed as shown in FIG. 3, and each of the members 15 contains an inertia-responsive light blocking element 18 which is movable longitudinally in the member 15 toward and away from the central housing 16. The light blocking elements 18 may each consist of a sphere or ball of any suitable opaque material, rollingly positioned in the associated signalling member 15. Suitable stop pins 19 are provided in the inner ends of the members 15 to prevent the balls 18 from rolling into the housing 16.

As will be apparent from the plan view in FIG. 2, the two signalling members 15 extend laterally to opposite sides of the housing 16, but in so doing they also extend forwardly in the direction of vehicle travel, so that in effect, they are mutually divergent in that direction. The lateral extent of the members 15 permits them to be readily seen from the back or from behind the vehicle, while the forward extent or slant thereof permits the balls 18 to roll longitudinally outwardly in the members 15 by the force of inertia when the vehicle is braked and decelerated. In FIG. 3 one of the balls 18 is shown in an outwardly rolled position at 18a, and it will be understood that the longitudinal extent to which the balls roll outwardly in the members 15 is governed by the force of inertia in proportion to the braking effect and deceleration, such interital force acting against the tendency of the balls 18 to roll back toward the housing 16.

The back rolling tendency or bias of the balls 18 may be attained in any suitable manner, as for example, by providing light compression springs (not shown) between the balls and the outer ends 15' of the members 15. Alternatively, as shown in the drawings, the members 15 may be inclined outwardly (see FIG. 3), so that the balls roll back toward the housing 16 by gravity when gravitational effect on the balls overcomes inertial forces which cause the balls to roll outwardly in the members 15. If the top of the trunk lid 11 happens to be horizontal, the device may be made so that the members 15 are inclined or slanted outwardly as shown in FIG. 3. On the other hand, if the top of the lid 11 should be forwardly inclined, as it frequently is, the member 15 need not be inclined relative to the housing 16, since they will automatically assume such inclination when the device is mounted on the inclined trunk lid.

The central housing 16 accommodates a source of light 20 such as an electric lamp held in a socket 21 affixed to the lid 11 by suitable fasteners 23. The light source 20 is located in the housing 16 at the intersection of the longitudinal axes of the two members 15, so that light rays emanating from the source 20 pass longitudinally outwardly through the interior of the members 15, out to a point wherever the opaque light blocking balls 18 may be disposed, as for example the point 18a. When viewed from the outside, portions of the signalling members 15 between the light source 20 and the light blocking members 18 will be clearly illuminated by the light source, but portions thereof outwardly beyond the light blocking balls 18 will be substantially without illumination. Since the balls 18 are movable longitudinally in the signalling members 15, the illuminated portions of the members 15 are variable in length in accordance with the distance of the balls 18 from the light source 20 which, in turn, is governed by the inertial force resulting from a given braking effort and corresponding rate of deceleration. It will be apparent from the foregoing that when the vehicle 12 equipped with the signal device 10 of the invention is braked, the balls 18 will move longitudinally outwardly in the signalling members 15 to a greater or lesser extent dependent upon the rate of deceleration, and the variable length of the illuminated portions of the members 15 will indicate to drivers of following vehicles how much braking effort they should use in order to avoid a rear-end collision. In addition to and apart from indicating the rate of deceleration, the signal device of the invention will also indicate when the vehicle is negotiating a curved path, as for example at sharp corners along the road, or when entering or leaving freeways. Under such conditions inertial or centrifugal force will cause the ball 18 to move outwardly in the signalling member 15 which is adjacent the outside of the curve, and that signalling member will become illuminated to a greater or lesser longitudinal extent depending upon the degree of curvature and vehicular speed, thus effectively warning following drivers that the vehicle equipped with the invention is not traveling along a straight path.

In order that the longitudinal extent of illumination of the signalling members 15 may be more accurately judged by following drivers, the members 15 may be provided with indicia, such as longitudinal division markers or differently colored zones, as exemplified at 24a, 24b, 24c, 24d in FIG. 5.

The light source 20 may become energized only when brakes are applied, which is quite satisfactory in instances where the primary purpose of the signal device is to indicate rate of deceleration. However, when the device is also used to indicate rounding or negotiation of curves in the road, the light source 20 may be energized constantly so that the signal device may be effective regardless of whether or not the brakes are applied. The somewhat modified embodiment of the invention shown in FIGS. 6 and 7 is functionally the same as the embodiment already described, but in a structural sense the aforementioned two straight tubular signalling members 15 find their equivalent in opposite, curved side portions 25' of an annular tube or toroid 25 having a light source 26 therein, the side portions 25' existing at the opposite sides of the light source.

An opaque light blocking ball 27 is rollingly positioned in each of the curved side portions 25', with the light source 26 itself serving to prevent movement of the ball 27 on either side to the other side of the tube 25. Similarly, at a point diametrically opposite from the light source 26, the tube 25 is provided with a stop pin 28, whereby to retain the balls 27 in their respective tube portions 25'.

The device of FIGS. 6 and 7 is particularly adapted for use on the rear of a bicycle, as for example, on top of the rear bicycle fender 29 shown fragmentarily in FIG. 7. In such an environment the device may be fully self-contained by providing a battery 30 to energize the light source 26. The battery may be accommodated in a suitable casing 31 extending diametrically within the annulus of the tube 25, suitable switch means (not shown) being used to interrupt the circuit to the lamp 26 when the use of the signal device is not desired. The battery casing 31 may be held in the tubular annulus 25 by suitable bracket means 32, and a conventional clamp arrangement 33 may be provided around the casing 31 to secure the entire device to the bicycle fender 29, as will be readily apparent.

It is to be noted that the device of FIGS. 6 and 7 is capable of not only signalling deceleration and turning of sharp corners, but also to indicate the presence of the bicycle on the road, since shifting of the rider's weight from side to side due to pedalling, will cause the signal device to sway laterally from side to side, with the result that the two balls 27 will be caused to alternately move away from the light source 26 and the side portions 25' of the device will be alternately illuminated to a greater and lesser extent, thus producing a laterally oscillating signal.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In an inertially actuated signal device for vehicles, the combination of elongated hollow signalling means formed from light-transmitting material, a source of light oriented to illuminate said signalling means from the interior thereof in a longitudinal direction, and inertia-responsive light blocking means movable in said signalling means longitudinally toward and away from said source of light, said light blocking means being operative to permit illumination of only that portion of the signalling means between the light source and the light blocking means while leaving the remaining portion of the signalling means substantially without illumination by the light source, whereby the illuminated portion of the signalling means is variable in length in accordance with the distance of said light blocking means from said light source.

2. The device as defined in claim 1 wherein said light blocking means are movable in said signalling means away from said source of light by a kinetic force incident to vehicular operation, said device also including means for automatically moving said light blocking means toward the light source when the kinetic force subsides.

3. The device as defined in claim 1 wherein said signalling means comprise a pair of tubular members disposed at opposite sides of said light source and extending therefrom in mutually divergent relation.

4. The device as defined in claim 3 together with a central housing carrying said pair of divergent tubular members and accommodating said source of light.

5. The device as defined in claim 3 wherein said light blocking means comprises a pair of opaque spherical elements rollingly positioned in the respective tubular members.

6. The device as defined in claim 1 together with indicia dividing said signalling means into a plurality of longitudinally successive zones with which the variable length of said illuminated portion of the signalling means may be visually coordinated.

7. The device as defined in claim 1 wherein said signalling means comprise an annular tube having said source of light located at a point within the tube, said light blocking means comprising a pair of opaque spherical elements rollingly positioned in said tube at opposite sides of the light source.

8. The device as defined in claim 7 together with a battery mounted in the annulus of said tube for energizing said source of light.

No references cited.

LOUIS J. CAPOZI, *Primary Examiner.*